United States Patent [19]

Doane

[11] Patent Number: 5,167,315

[45] Date of Patent: Dec. 1, 1992

[54] CARTON ALIGNER FOR TWO-WAY DIVERTER

[75] Inventor: Martin R. Doane, Ada, Mich.

[73] Assignee: Rapistan Demag Corporation, Grand Rapids, Mich.

[21] Appl. No.: 773,230

[22] Filed: Oct. 9, 1991

[51] Int. Cl.⁵ ............................................. B65G 47/46
[52] U.S. Cl. .................................. 198/362; 198/370; 198/440; 198/456
[58] Field of Search .............. 198/362, 365, 370, 440, 198/456

[56] References Cited

U.S. PATENT DOCUMENTS

| | | | |
|---|---|---|---|
| 3,269,519 | 12/1964 | De Good et al. | 198/127 |
| 3,361,247 | 1/1968 | Lauzon et al. | 198/365 |
| 3,508,640 | 11/1967 | De Good et al. | 198/33 |
| 3,799,319 | 3/1974 | Cutler et al. | 198/29 |
| 3,880,298 | 4/1975 | Habegger et al. | 214/11 R |
| 3,987,888 | 10/1976 | Wickam | 198/802 |
| 4,044,897 | 8/1977 | Maxted | 214/11 R |
| 4,283,245 | 8/1981 | Benoit | 198/440 |
| 4,284,186 | 8/1981 | Brouwer | 198/415 |
| 4,319,676 | 3/1982 | Turnbough | 198/449 |
| 4,577,745 | 3/1986 | Calvert et al. | 198/440 |
| 4,732,259 | 3/1988 | Yu et al. | 198/365 |
| 5,038,911 | 8/1991 | Doane et al. | 198/357 |

Primary Examiner—Joseph E. Valenza
Attorney, Agent, or Firm—Price, Heneveld, Cooper, DeWitt & Litton

[57] ABSTRACT

A conveying apparatus for selective lateral alignment of packages with laterally spaced apart right-hand or left-hand vertical planes includes a conveying surface made up of support members connected together in an endless web and a pair of diverting shoes mounted to each support member. A network of guide tracks guides the movement of one of each pair of guide shoes along either a non-diverted path or a diverted path to laterally divert packages. Diverted packages are aligned by the other of each pair of shoes guided by the guide tracks in a fixed path.

19 Claims, 5 Drawing Sheets

CARTON ALIGNER FOR TWO-WAY DIVERTER

BACKGROUND OF THE INVENTION

The invention relates generally to a carton aligner for lateral alignment of cartons, or packages, on a conveying surface and more particularly to selective left-hand or right-hand alignment of packages. The invention is particularly adapted to providing proper lateral orientation of packages for sortation systems capable of opposite-direction diverting of packages.

Two-way, or bi-directional, sortation systems that are capable of diverting packages laterally to spurs extending in opposite directions are well-known. An example is the system disclosed in U.S. Pat. No. 3,361,247 to Lauzon et al. Certain such two-way sortation systems require packages to be positioned on the same lateral side of the sortation system as the spur to which the package is to be diverted. One such sortation system is disclosed in commonly assigned U.S. Pat. No. 3,269,519, issued to M. J. DeGood et al.

It is usually desirable to be able to maintain the longitudinal edge-to-edge spacing, or gap, between packages that are discharged to a sortation system. Induction subsystems are known that are capable of precisely establishing a desired spacing, or gap, between packages in order to enhance the through-put of the system. One such induction system is disclosed in commonly assigned U.S. Pat. No. 5,038,911, issued to Martin R. Doane et al for CONTROLLED SPACING FROM PLURAL LINES. Once a precise gap has been established between packages, it is desirable to be able to maintain the desired gap while providing the necessary two-way edge alignment required for the above mentioned two-way sortation systems. If such desired gap cannot be maintained, then additional spacing must be provided between packages in order to accommodate the variability in spacing. Such additional gap, of course, reduces the through-put of the system.

Known types of edge alignment systems tend to distort the spacing between packages. One such system is a herringbone roller bed which uses rollers that are positioned at an angle to the direction of package movement in order to laterally divert packages against a rail to provide the left-hand or right-hand alignment. The difficulty is that smaller packages must be laterally diverted a greater distance in order to provide the necessary edge alignment. Because the packages are diverted along the hypotenuse of a triangle, the greater lateral movement of smaller packages provides an increase in the total distance moved, which distorts the spacing with the packages in front of, and trailing, the given package. Therefore, the width of each particular package, or carton, affects the gap with packages in front of and behind it.

Another known edge alignment system utilizes a moving vertical belt positioned in the path of package travel at an angle with respect to the direction of travel in order to laterally divert the cartons. The aligner has a portion that is initially contacted by packages and is at a steep angle with respect to the direction of travel of packages in order to laterally divert the packages. The angle of the belt becomes less steep, through one or more angle changes, further downstream in order to re-turn the edge-aligned cartons to their original front-to-back alignment, so that the cartons are not turned on the conveyor. Because the belt is on an angle with respect to the conveying surface, the angle and speed of the belt affects the rate of travel of each diverted package. As the angle becomes more shallow, there should be a commensurate change in the belt speed in order to compensate for the difference in angle. However, this is not usually possible because such belt alignment systems typically only have one belt which can only have one speed. Therefore, there is a change in the speed, and hence the gap between packages of different widths and between diverted versus non-diverted packages.

SUMMARY OF THE INVENTION

The present invention is intended to provide a two-way carton aligner that is capable of selective left-hand and right-hand carton alignment without distorting the longitudinal edge-to-edge spacing, or gap, between packages.

According to the invention, a conveying surface is provided, which is defined by the uppermost ones of a plurality of elongated support members connected together in a spaced apart manner in an endless web. A diverter is provided that is selectively actuatable in order to laterally displace packages from a first region of the conveying surface through a second region that is laterally spaced from the first region. The packages are diverted while the longitudinal placement of displaced packages is maintained on the conveying surfaces. Packages that are not diverted by the diverter remain in the first region. A lateral aligner is provided extending from a location laterally outside of the second region to a location that borders the second region. The edge aligner is adapted to aligning diverted packages with the second region while maintaining the longitudinal placement of packages on the conveying surface.

The invention may be embodied in a conveying apparatus including at least one diverting shoe mounted to each of the support members for lateral movement along the corresponding support member. A track means is provided underlying the conveying surface for guiding the lateral movement of each of the diverting shoes. The track means may include a first pathway for guiding particular diverting shoes in one of the regions and a second pathway for guiding other ones of the diverting shoes from the one region into and beyond the other region. The track means further includes switch means for selectively diverting the diverter shoes onto one of the first and second pathways.

Such embodiment of the invention may further include a second diverting shoe mounted to each of the support members and means for guiding the second shoes from a position laterally outwardly of the other region along a third pathway that is tangential with the other region at at least one position. This provides lateral alignment with the other region while maintaining the longitudinal placement of aligned packages on the conveying surface. These and other objects, features and advantages of the invention will become apparent upon review of the following specification in conjunction with the drawings.

DETAILED DESCRIPTION OF THE PREFERRED EMBODIMENT

Figure 1:
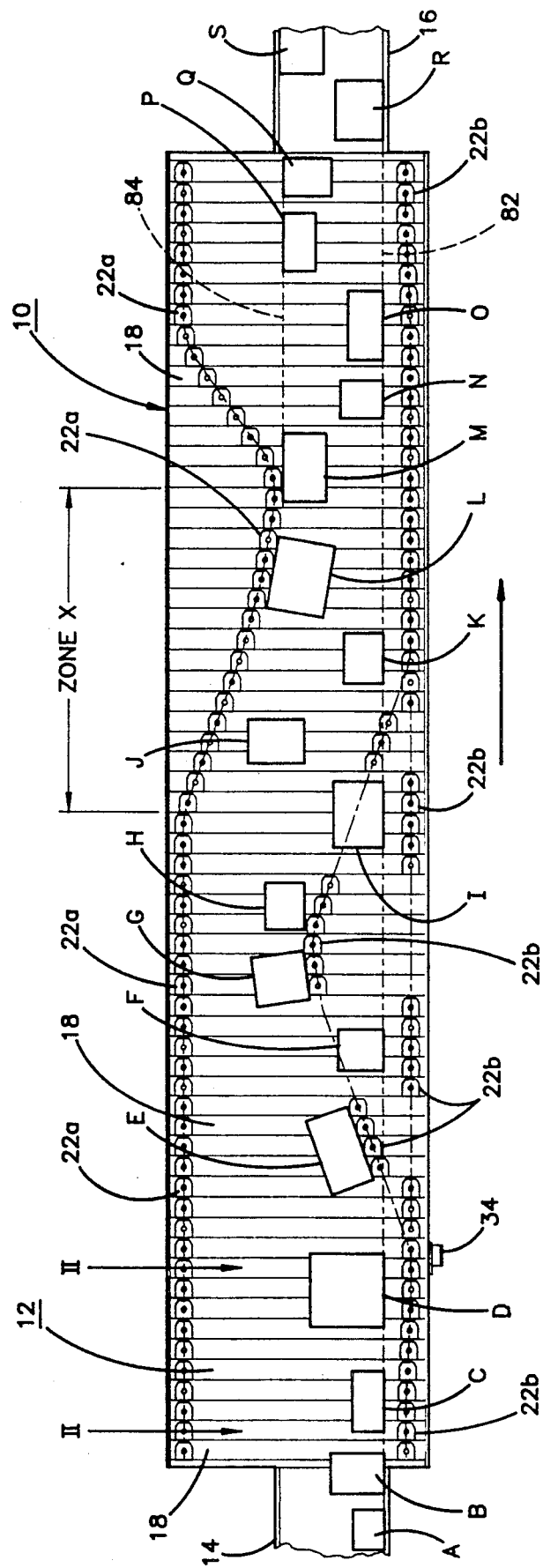
FIG. 1 is a plan view of a carton aligner according to the invention.
Figure 2:
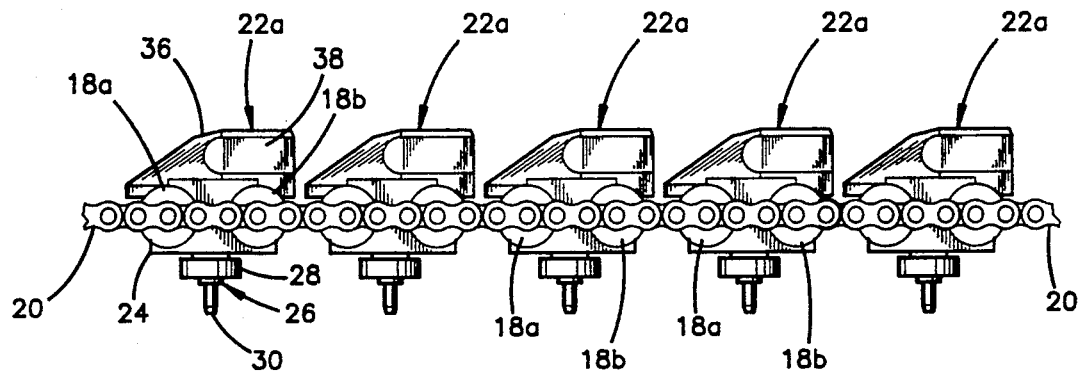
FIG. 2 is a sectional view taken along the line II—II in FIG. 1.

Referring now to the drawings and the illustrated embodiment depicted therein, a carton alignment, generally designated as 10, includes a conveying surface 12, moving from left to right as illustrated in FIG. 1, a feed conveyor 14 for feeding packages onto conveying surface 12 and a receiving conveyor 16 for receiving packages discharged from conveying surface 12. As best seen by reference to FIG. 2, conveying surface 12 is defined by the uppermost ones of a plurality of elongated support members 18 connected in spaced apart fashion at opposite ends to one of a pair of endless chains 20. A pair of positive-displacement diverting shoes 22a and 22b are mounted to each support member 18 for lateral movement therewith.

Support members 18 are illustrated as being a pair of round tubular members 18a, 18b but may, alternatively, be in a unitary slat configuration, such as the parallelogram-shaped slats illustrated in commonly assigned co-pending application Ser. No. 07/606,585, filed Oct. 31, 1990, by David H. Cotter et al for MODULAR DIVERTER SHOE AND SLAT CONSTRUCTION, the disclosure of which is hereby incorporated herein by reference. Chains 20 are supported by appropriate support means (not shown) including guide channels and a pair of longitudinally spaced rotatable sprockets, of which one is driven, in order to cause conveying surface 12 to move at a constant speed, as is well understood by the skilled artisan. Each diverter shoe 22a, 22b includes a support portion 24 which is laterally movable along the associated support member 18 and has a downwardly extending bearing and pin assembly 26 including a bearing 28 mounted concentrically with a lower pin 30. Each bearing 28 is for engagement with one or more of a plurality of guide tracks making up a guide means, generally shown at 32 in FIG. 3, in order to laterally displace the associated diverter shoe along its support member. Pin 30 is for engagement by a diverter switch 34 in order to selectively direct particular diverter shoes 22b onto particular portions of guide means 32. Each diverter shoe 22a, 22b further includes a diverting portion 36 mounted above the support portion and having at least one lateral diverting surface 38 for laterally displacing cartons on conveying surface 12 in response to lateral movement of the diverter shoes.

Figure 3:
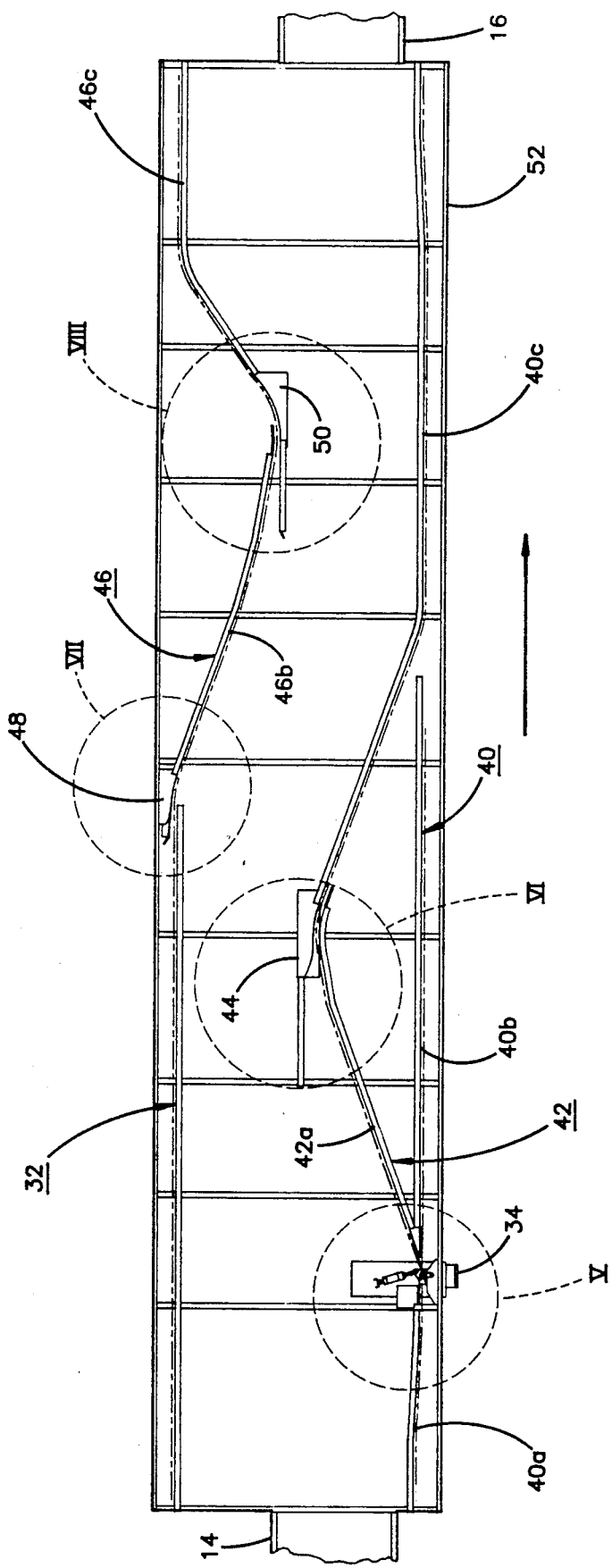
FIG. 3 the same view as FIG. 1 with the conveying surface removed in order to reveal subjacent details.

Guide means 32 is defined by a plurality of pathways including a first pathway generally illustrated at 40, including a lead-in guide track 40a, a second, linear guide track 40b and a third, linear guide track 40c (FIG. 3). Guide tracks 40a, 40b and 40c are in line such that a diverting shoe 22b travelling along first pathway 40 will be retained laterally toward the right-hand lateral portion of conveying surface 12, as viewed from the direction of movement of packages (toward the bottom as viewed in FIGS. 1 and 3). Guide means 32 further includes a second pathway, generally illustrated at 42, having a first guide track 42a diverging at diverter switch 32 from guide track 40b in the direction of movement of conveying surface 12, a transition section 44 and a second guide track 42b converging from transition section 44 with first pathway 40. First and second pathways 40, 42 are for guiding particular diverter shoes 22b under the selective control of diverter switch 34. With diverter switch 34 in the position illustrated in FIG. 4, diverter shoes 22b will remain on first pathway 40. With diverter switch 34 in the position illustrated in FIG. 5, diverter shoes 22b will be diverted onto second pathway 42.

A third pathway 46 is provided that includes a first guide track 46a, a first transition section 48, a second guide track 46b, a second transition section 50 and a third guide track 46c. Third pathway 46 is for the purpose of guiding the movement of diverter shoes 22a and guides the movement of all shoes 22a along the same pathway. The various components making up guide means 32 and diverter switch 34 are supported by a frame, generally illustrated at 52, which also supports the conveying surface 12 and the sprockets mounting endless chains 20. Diverter shoes 22a, 22b are appropriately positioned at the opposite lateral ends of conveying surface 12, when they reach the point of package discharge onto receiving conveyor 16, for return to the proper position at the point of package acceptance from feed conveyor 14.

Figure 4:
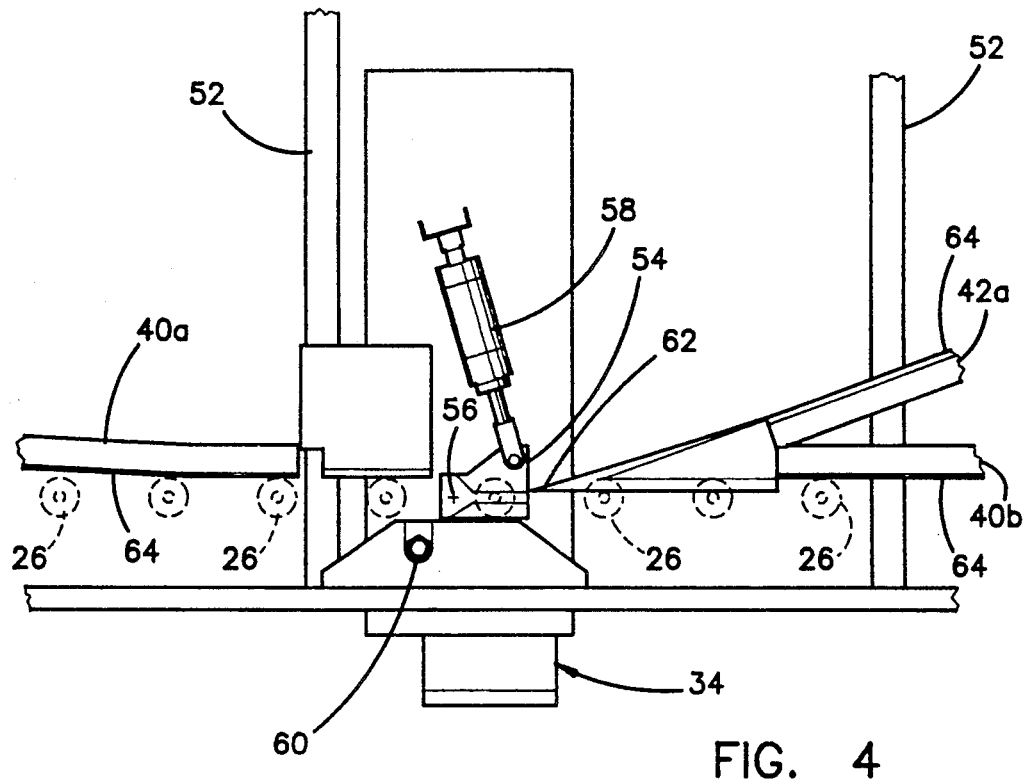
FIG. 4 is an enlarged plan view of the area designated IV in FIG. 3.
Figure 5:
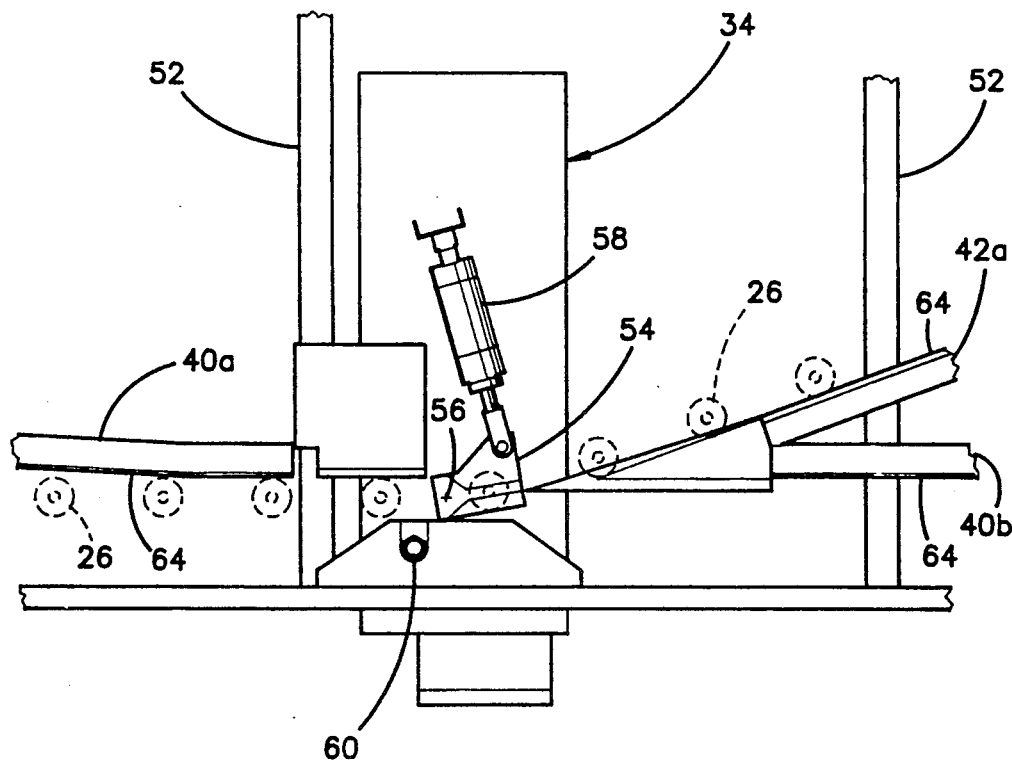
FIG. 5 is the same view as FIG. 4 illustrating operation of diverting means.

Diverter switch 34 includes a diverting member 54 which is pivoted about a pivot 56 by a pneumatic or hydraulic cylinder 58 (FIGS. 4 and 5). A photodetector 60 provides input to a control (not shown) having an output to selectively actuate cylinder 58. In this manner, when the control determines that the next diverter shoe 22b is to be diverted onto guide track 42a, diverter switch 34 is actuated to the position illustrated in FIG. 5, by the control causing cylinder 58 to retract in response to photodetector 60 to detecting the presence of a guide pin. If a diverter shoe 22b is to be diverted onto guide track 40b, diverter switch 34 is actuated to the position illustrated in FIG. 4 by the control causing the cylinder 58 to extend, if presently in the position shown in FIG. 5, in response to photodetector 60 detecting the presence of a guide pin 30. Diverter switch 34 includes a knife edge 62 to force the oncoming pin 30 to be directed onto one of the guide tracks 42a, 42b. Each of the guide tracks 40a–40c, 42a–42b and 46a–46c includes a vertical guide surface 64 for engagement by bearings 28 in order to guide the movement of the diverter shoes 22a, 22b along the guide tracks.

Figure 6:
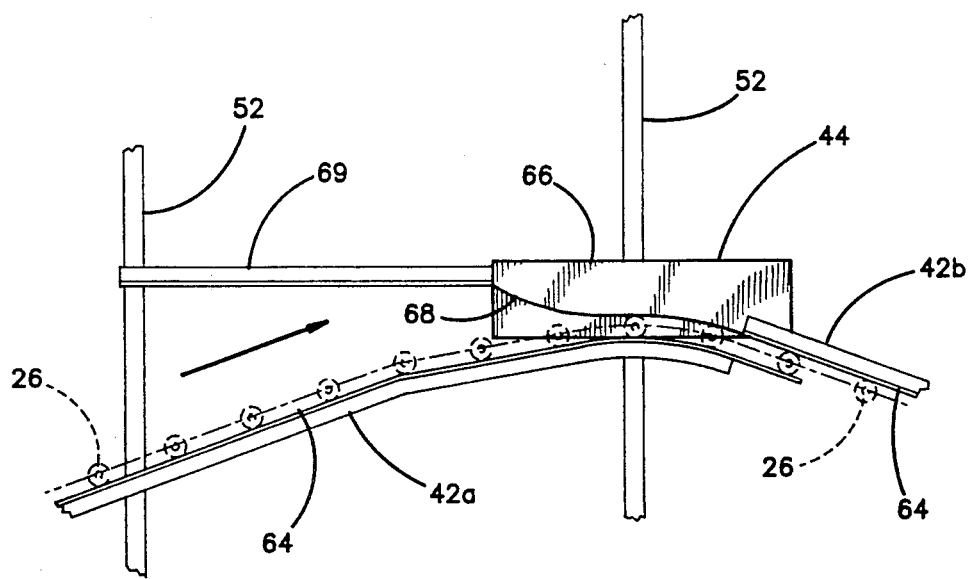
FIG. 6 is an enlarged plan view of the area designated VI in FIG. 3.
Figure 7:
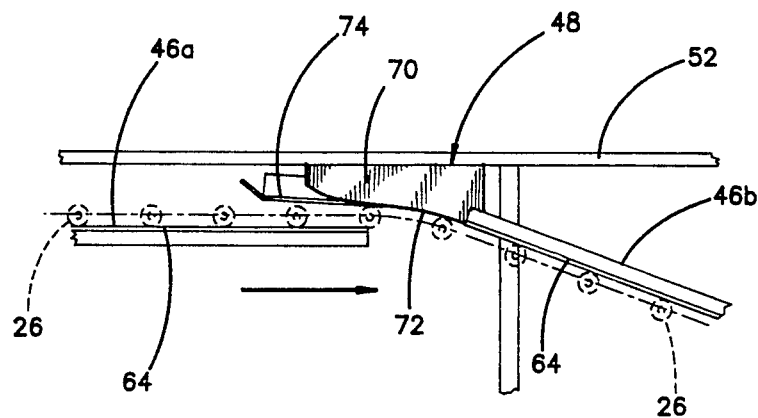
FIG. 7 is an enlarged plan view of the area designed VII in FIG. 3.
Figure 8:
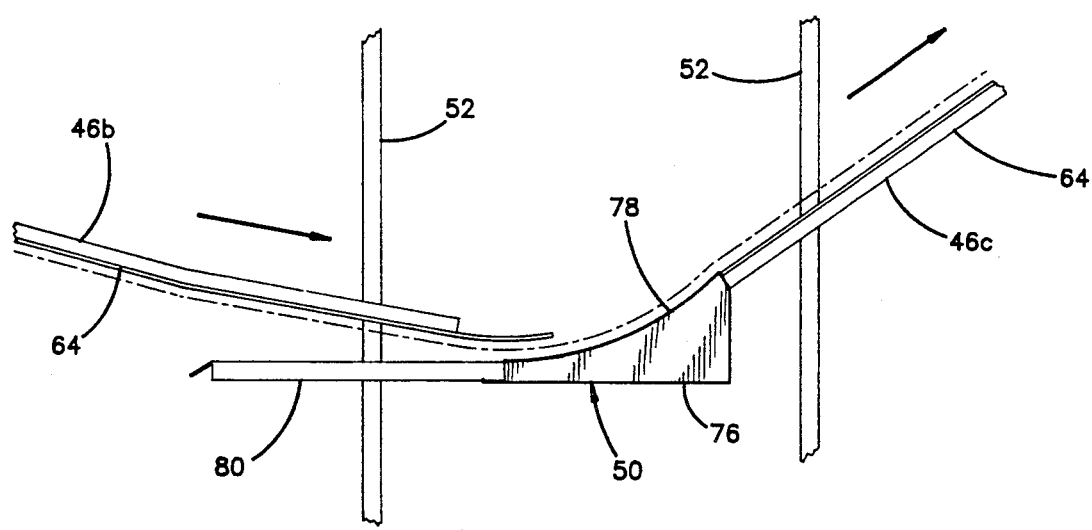
FIG. 8 is an enlarged plan view of the area designated VIII in FIG. 3.

Transition section 44 includes a body 66 configured to include a vertical surface 68 which is geometrically configured to define a low-acceleration transition from the guide surface 64 associated with guide track 42 to the guide surface 64 associated with guide track 42b (FIG. 6). In order to reduce noise, vertical surface 68 may be lined with a durable polymer, such as PTFE. In the illustrated embodiment, body 66 is made entirely of PTFE. A capture member 69 may be provided in order to ensure that all diverted shoes are guided onto guide track 42b. Likewise, transition section 48 includes a body 70 configured to include a vertical surface 72 which is geometrically configured to define a low-acceleration transition between the guide surface 64 associated with guide rail 46a and the guide surface 64 associated with guide rail 46b (FIG. 7). A capture member 74 may be provided in order to ensure that bearings 28 are guided smoothly onto vertical surface 72. Transition section 50 includes a body 76 which is configured to include a vertical surface 78 which is configured to guide bearings 28 in a low-acceleration transition from the guide surface 64 associated with guide track 46b to the guide surface 64 associated with guide rail 46c. A capture member 80 may be provided to ensure that bearings 28 are guided onto guide track 46c. In the illustrated embodiment, bodies 70 and 76 are also made from PTFE.

In operation, packages enter conveying surface 12 from feed conveyor 14 (FIG. 1). In the illustrated embodiment, the packages are right-hand aligned when discharged onto conveying surface 12. Namely, a lateral edge of the packages entering conveying surface 12 from feed conveyor 14 are aligned with an imaginary right-hand vertical plane, generally defined at 82. Vertical plane 82 defines the lateral boundary of a right-hand lateral region of conveying surface 12. When a package reaches diverter switch 34, which is the approximate position of package D, unless switch 34 is actuated to the position illustrated in FIG. 5, the package will continue to travel with a lateral edge aligned with right-hand plane 82, as has occurred with packages F, I, K, N, 0 and R. If diverter switch 34 is actuated to the position illustrated in FIG. 5 when the shoes adjacent the package to be diverted reach the diverter switch, the diverter shoes are transferred onto second pathway 42 to divert the package to the left beyond an imaginary left-hand vertical plane 84, as has occurred with packages E, G, H, J, L, M, P, Q and S. Such packages are destined for left-hand alignment with left-hand vertical plane 84 as has already occurred with packages M, P, Q and S. Vertical plane 84 defines the lateral boundary of a left-hand region of conveying surface 12. When the first shoe of the group associated with a particular package that is destined for left-hand alignment reaches photodetector 60, the control retracts cylinder 58 in order to switch diverter switch 34 to the position illustrated in FIG. 5. The control will maintain the switch in the position in FIG. 5 for the duration of count of the number of shoes associated with the package to be diverted. The number of shoes is determined by the control in response to means for measuring the length of particular packages (not shown).

Once a number of shoes are diverted onto second pathway 42, the lateral movement of the shoes with respect to the support members 18 supporting the package to be diverted, causes a lateral displacement of the package as the conveying surface 12 moves. The package is laterally displaced toward and beyond left-hand plane 84, until the associated shoes reach transition section 44 at which case the shoes begin a movement back toward right-hand plane 82 under the guidance of guide track 42b. Even though the diverter shoes 22b begin movement back towards right-hand plane 82, the packages remain at their diverted position on the conveying surface, as seen by packages H and J. Eventually, the diverted packages come into contact with shoes 22a in alignment zone X which displaces the packages into alignment with left-hand plane 84.

The movement of shoes 22a in alignment zone X are guided by guide track 46b and continue to displace the package until a lateral edge thereof is aligned with left-hand vertical plane 84, as illustrated by package M. The movement of shoes in alignment zone X follows a nonlinear course in which the rate of lateral displacement is greater in the initial portion of alignment zone X and decreases in the latter portions of alignment zone X until the shoes become tangent with the left-hand plane 84 at transition section 50. Because the rate of change of lateral movement of the shoes decreases as the shoes approach transition section 50, the angle of diverting of the packages becomes tangential with the left-hand plane 84 such that the packages are properly front-to-back oriented in a line with the plane, as illustrated by package M. After transition section 50, diverting shoes 22a move back laterally away from left-hand plane 84 under the guidance of guide track 46c. However, once the packages are aligned with left-hand plane 84, they remain in alignment with the plane when being deposited on receiving conveyor 16, as seen by packages P, Q and S. The distance between the maximum lateral displacement of diverter shoes 22b (at transition section 44) and left-hand vertical plane 84 is less than the minimum width package to be aligned by the system. This ensures that all diverted packages will be contacted by shoes 22a for proper edge-alignment with left-hand vertical plane 84.

Because the packages are conveyed on a travelling positive-engagement conveying surface, the longitudinal spacing between packages is preserved. The packages, which may be rotated during the alignment process, are returned to the same general rotational alignment as upon entering the carton aligner. Accordingly, packages on receiving conveyor 16 have the same spacing between the trailing edge of lead packages and the lead edge of following packages as when on feed conveyor 14 The system is capable of handling packages of great variation in both width and length without distorting the package spacing. Because of the change in rate of lateral displacement of shoes 22a as the packages move through alignment zone X, the packages are rapidly moved into alignment with left-hand plane 84 without undue jarring and acceleration of the package while providing proper front-to-rear alignment of the package upon discharging from alignment zone X.

While the invention is illustrated with the use of diverting shoes actuated by subjacent guide tracks, the invention is capable of other implementations. For example, the function performed by diverter shoes 22a in alignment zone X could be performed by a low-friction guide rail provided that the frictional engagement with the packages is low enough that the packages retain their longitudinal position on conveying surface 12. However, the disclosed embodiment is preferred because the diverting shoes are mounted for movement with the conveying surface and, hence, reduce the risk of longitudinal displacement of the package with respect to the conveying surface.

Other changes and modifications in the specifically described embodiments can be carried out without departing from the principles of the invention, which is intended to be limited only by the scope of the appended claims, as interpreted according to the principles of patent law, including the Doctrine of Equivalents.

The embodiments of the invention in which an exclusive property or privilege is claimed are defined as follows:

1. A conveying apparatus for selectively aligning packages with one of a pair of laterally spaced apart regions comprising:
a conveying surface moving in a longitudinal direction and defined by the uppermost ones of a plurality of elongated support members connected together in a spaced apart manner in an endless web;

a diverter that is selectively actuatable in order to laterally displace packages in a given direction from a first region of said conveying surface through a second region that is laterally spaced from said first region while maintaining longitudinal positioning of packages on said conveying surface, wherein packages that are note diverted by said diverter remain in said first region; and a lateral aligner extending from a location laterally outside of said second region in a direction opposite said given direction to a location that borders said second region, said lateral aligner being adapted to aligning packages diverted by said diverter that are not properly aligned by said diverter with said second region while maintaining longitudinal positioning of said aligned packages on said conveying surface.

2. The conveying apparatus in claim 1 wherein said diverter includes a plurality of diverting shoes mounted for longitudinal travel with said conveying surface and means for laterally displacing particular ones of said diverting shoes that are longitudinally aligned with packages to be diverted.

3. The conveying apparatus in claim 2 wherein said lateral aligner includes a plurality of other diverting shoes mounted for longitudinal travel with said conveying surface and means for laterally displacing said other diverting shoes toward said second region.

4. The conveying apparatus in claim 5 wherein said lateral aligner includes a plurality of diverting shoes mounted for longitudinal travel with said conveying surface and means for laterally displacing said diverting shoes toward said second region.

5. A conveying apparatus for selectively aligning packages with one of a pair of laterally spaced apart regions comprising:

a conveying surface moving along a longitudinal axis and defined by the uppermost ones of a plurality of elongated support members connected together in a spaced apart manner in an endless web;

a plurality of diverting shoes adapted to applying a lateral force in order to displace packages on said conveying surface, at least one of said diverting shoes being mounted to each of said support members for lateral movement along the corresponding said support member;

track means underlying said conveying surface for guiding said lateral movement of said diverting shoes, said track means including a first pathway for guiding particular ones of said diverting shoes in one of said regions, a second pathway for guiding other ones of said diverting shoes from said one of said regions into the other one of said regions, and switch means for selectively diverting said diverter shoes onto one of said first and second pathways; and alignment means operative subsequent to displacement of packages by said diverting shoes for aligning packages diverted by said diverting shoes guided on said second pathway with said other one of said regions while maintaining longitudinal positioning of packages on said conveying surface.

6. The conveying apparatus in claim 5 wherein said alignment means includes a second said diverting shoe on each of said support members and means for guiding said second diverting shoes from a position laterally outwardly of said other one of said regions along a third pathway that is tangential with said other one of said regions at at least one place.

7. The conveying apparatus in claim 6 wherein said third pathway has a portion which decreases in angle with respect to said longitudinal axis in the direction of movement of said conveying surface.

8. The conveying apparatus in claim 5 wherein said second pathway diverges from said first pathway at said switch means and converges with said first pathway at a location spaced from said switch means in the direction of movement of said conveying surface.

9. A conveying apparatus for selectively aligning a lateral edge of packages positioned in longitudinal single file with one of a pair of laterally spaced apart longitudinally extending vertical planes comprising:

a longitudinally moving conveying surface defined by the uppermost ones of a plurality of elongated support members connected together in a spaced apart manner in an endless web;

a plurality of diverting shoes adapted to applying a lateral force in order to displace packages on said conveying surface, first and second ones of said diverting shoes being mounted to each of said support members for lateral movement along the corresponding said support member; and track means underlying said conveying surface for guiding said lateral movement of said diverting shoes, said track means including a first pathway for guiding particular ones of said first diverting shoes along an axis generally laterally outwardly of one of said vertical planes, a second pathway for guiding other ones of said first diverting shoes toward the other one of said vertical planes, switch means for selectively diverting said first diverter shoes onto one of said first and second pathways, and a third pathway for guiding said second diverting shoes, said third pathway having a curved portion extending from a location laterally outwardly of the other one of said vertical planes toward and tangential with said other one of said vertical planes to cause said second shoes to align a lateral edge of packages diverted by said first diverting shoes with said other one of said vertical planes subsequent to the packages being diverted by the first diverter shoes.

10. The conveying apparatus in claim 9 wherein said curved portion decreases in angle with respect to said vertical planes in the direction of movement of said conveying surface.

11. The conveying apparatus in claim 9 wherein said second pathway diverges from said first pathway at said switch means and converges with said first pathway at a location spaced from said switch means in the direction of movement of said conveying surface.

12. The conveying apparatus in claim 9 wherein said first pathway is substantially linear.

13. The conveying apparatus in claim 9 wherein said second pathway has a first portion that diverges from said first pathway, a second portion that converges with said first pathway and a transition section joining said first and second portions.

14. The conveying apparatus in claim 9 wherein said third pathway includes a first portion that is substantially linear and a transition section joining said first portion with said curved portion in a manner that said curved portion diverges laterally inwardly from said first portion.

15. The conveying apparatus in claim 14 wherein said third pathway includes a second portion that is substantially linear and generally aligned with said first portion, a third portion converging with said second portion and another transition section joining said curved portion and said third portion.

16. The conveying apparatus in claim 15 wherein said first pathway is substantially linear.

17. The conveying apparatus in claim 16 wherein said second pathway has a fourth portion that diverges from said first pathway, a fifth portion that converges with said first pathway and a third transition section joining said fourth and fifth portions.

18. The conveying apparatus in claim 15 wherein said second pathway has a fourth portion that diverges from said first pathway, a fifth portion that converges with said first pathway and a third transition section joining said fourth and fifth portions.

19. The conveying apparatus in claim 9 wherein said second pathway guides said other ones of said first diverting shoes to a lateral position that is spaced from said other one of said vertical planes a distance that is less than a minimum width of packages to be selectively aligned with one of said pair of vertical planes.

* * * * *

UNITED STATES PATENT AND TRADEMARK OFFICE
CERTIFICATE OF CORRECTION

PATENT NO. : 5,167,315

DATED : December 1, 1992

INVENTOR(S) : Martin R. Doane

It is certified that error appears in the above-identified patent and that said Letters Patent is hereby corrected as shown below:

Column 2, line 67:
      After "Fig. 3" insert --is--.

\* Column 3, line 7:
      "designed" should be --designated--.

Column 6, line 30:
      After "14" insert --,--.

Column 7, claim 1, line 7:
      "note" should be --not--.

\* Column 7, claim 4, line 29:
      "claim 5" should be --claim 1--.

Signed and Sealed this

Seventh Day of June, 1994

Attest:

BRUCE LEHMAN

Attesting Officer     Commissioner of Patents and Trademarks